United States Patent [19]

Pirz

[11] 4,149,242
[45] Apr. 10, 1979

[54] DATA INTERFACE APPARATUS FOR MULTIPLE SEQUENTIAL PROCESSORS

[75] Inventor: Frank C. Pirz, Piscataway, N.J.

[73] Assignee: Bell Telephone Laboratories, Incorporated, Murray Hill, N.J.

[21] Appl. No.: 794,464

[22] Filed: May 6, 1977

[51] Int. Cl.² .................................................. G06F 3/00
[52] U.S. Cl. .................................................... 364/200
[58] Field of Search ... 364/200 MS File, 900 MS File

[56] References Cited

U.S. PATENT DOCUMENTS

| 3,551,894 | 12/1970 | Lehman et al. | 340/147 C |
|---|---|---|---|
| 3,699,533 | 10/1972 | Hunter | 364/200 |
| 3,815,095 | 6/1974 | Wester | 364/200 |
| 3,820,079 | 6/1974 | Bergh et al. | 364/200 |
| 3,970,993 | 7/1976 | Finnila | 364/200 |
| 3,976,976 | 8/1976 | Khosharian | 364/200 |
| 4,007,450 | 2/1977 | Haibt et al. | 364/200 |

OTHER PUBLICATIONS

Higbie, L. C., "The Omen Computers: Associative Array Processors", *IEEE Computer Society International Conference*, 1972, pp. 287-289.

"Signal Processor on Plug-In Board", *Electronics*, vol. 50, No. 5, Mar. 3, 1977, pp. 159-160.

Russo, P. M., "Interprocessor Communication for Multi-Microcomputer Systems", *Computer*, vol. 10, No. 4, Apr. 1977, pp. 67-74.

*Primary Examiner*—Raulfe B. Zache
*Attorney, Agent, or Firm*—Stephen J. Phillips

[57] ABSTRACT

Apparatus is disclosed for transferring data between multiple peripheral processors (PPs) which are operating under control of a host processor in a multi-processor computer system. In a high data rate application a number of dedicated special purpose PPs are arranged in fixed sequence to provide individual data processing steps. A data path is provided between each PP data memory and the next. A PP transfer unit associated with each PP data memory controls data transfer simultaneously between all PPs. Separate read/write address mapping is provided for each PP data memory. Control information may be associated with each mapped PP data memory location to provide logic functions and data rearrangements during the transfer process. Data from several PPs may be interleaved or may be logically or arithmetically combined with other PP data or constant information.

21 Claims, 3 Drawing Figures

COMMON CONTROL CIRCUIT

DATA INTERFACE APPARATUS FOR MULTIPLE SEQUENTIAL PROCESSORS

BACKGROUND OF THE INVENTION

1. Field of the Invention

This invention relates to computer systems and more particularly to multi-processor computer systems wherein a host processor controls the actions of a plurality of peripheral processors.

2. Description of the Prior Art

In certain high data rate applications such as radar processing, seismic processing, voice processing, and others the required data processing rate may be too great for a single data processor of the desired size to process all data in the time allowed. In one solution to such problems relating to data processing capacity it is known to reduce the load on the main, or host data processor by providing a secondary data processor, controlled by the host, which performs part of the processing for the host. Such a secondary data processor will be herein referred to as a peripheral processor or PP.

In prior art systems typically, the host processor transfers a block of data into a data memory associated with the PP. The PP then transforms the data in some desired fashion under the control of its own independent stored program, if the PP includes a computer, or otherwise under the control of a fixed logic arrangement. The host then reads the partially processed data out of the PP data memory. A typical example of such a host processor coupled with a single PP is found in the article "The Omen Computers: Associative Array Processors" by L. C. Higbie, IEEE Computer Society International Conference, 1972, pages 288 and 289.

If the required data processing rate is greater than can be accomplished with the aid of a single PP, additional PPs may be added to the host to perform additional job steps. In the prior art this has been accomplished by interfacing multiple PPs with the host computer data bus, each PP having the appearance of a peripheral input/output device. The host must then read results from one PP data memory and then write these results into the data memory of the next PP in turn. This type of arrangement is referred to, for example, at pages 159–160 of Electronics, Vol. 50, No. 5, Mar. 3, 1977. As the number of PPs increases, the load on the input/output data bus and the load on the host memory access circuitry increases. In some applications it may be desirable to use a substantial number of PPs. One such application arises in speech analysis problems such as word recognition, speaker verification and pitch detection. Steps such as digital bandwidth filtering, fast Fourier transform, convolution, correlation, and others may be provided by PPs. In such applications the processing rate may be limited by the total number of data accesses required to transfer data from the data memory of one PP to the next.

One prior art solution to the transfer rate problem for multiple PPs has been to provide a crossbar switch to interconnect multiple PP processors with multiple PP data memories. An example of one such system is found in U.S. Pat. No. 3,551,894 by Lehman et al. Connections are rearranged through the crossbar switch to associate the partially processed data left in each data memory with the next PP processor which is to act upon it. This technique suffers from the disadvantages that the crossbar switch is complex and nonmodular in structure, and the amount of hardware required grows approximately in relation to the square of the number of PPs involved.

Another technique for reducing the necessity to transfer data between the host and PP data memory is to arrange for each PP to access the host memory on a cycle-stealing basis. Host processor memory thus provides a common pool of memory for the PPs. With this technique the effect of transferring data from one PP data memory to the next is typically achieved by altering pointer information used to access host processor memory, so that the physical memory locations accessed by a given PP processor can be easily altered as processing proceeds. However, as the number of PPs increases the PPs occupy an increasing portion of the available memory access time, possibly interfering with the host processor. In extreme cases the host processor actually may be prevented from performing useful work as the PPs make demands on the host memory. This problem is discussed in Computer, Vol. 10, No. 4, April 1977 in the article "Interprocessor Communication for Multi-Microcomputer Systems" by P. M. Russo at page 69.

Prior art arrangements so far discussed suffer from problems which are solved by the present invention. In those prior art arrangements wherein data is physically transferred from one data memory to the next, data processing must await data transfer. Since data transfer is taking place on a word-by-word sequential basis, there is opportunity for performing some of the required data processing while the data is in transit and prior to the beginning of processing by the PP processor. Further, in prior art systems data is either physically moved or left in place for the succeeding PP processing step in discrete blocks of contiguous words. Data words are thus made available to the succeeding PP in whatever arrangement is convenient to the prior PP. The succeeding PP may first have to rearrange the data words before actual processing can get under way. Each of these problems decreases the overall processing rate of each PP step and increases the complexity of the processing by the PP.

SUMMARY OF THE INVENTION

The present invention comprises improved peripheral processor (PP) data transfer apparatus which includes one or more direct data paths between PP data memories thus avoiding the necessity of transferring data between each PP and the host processor. The invention provides for reduced data transfer time by having all transfers between PP data memories performed simultaneously. This is accomplished by applying common address control signals and timing signals to all PP transfer units simultaneously. Data rearrangement is accomplished during transfer by mapping the common address control signals into the actual addresses to be used by each PP data memory. Rearrangement flexibility is achieved by providing separate address mapping for reading and writing. Different numbers of words may be transferred to each PP data memory through the use of a conditional write control feature. Preliminary processing of the transferred data is achieved by providing arithmetic and logic hardware in the data path and under control of address mapping hardware. This permits data being transferred to be combined with constant information stored on a word-by-word basis, or with data being transferred from a different PP source. Data to be processed by a PP may be assembled from several other PP sources on a word-by-word basis through the action of selection apparatus.

The present invention solves the problems found in the prior art set forth above in that data processing is provided for data in transit thereby simplifying the processing needed to be performed by the PP. Also, data rearrangement is made possible in a flexible fashion further simplifying PP processing. This additional processing is achieved at no additional expense in processing time since processing takes place during time needed for data transfer. These and other advantages will become evident when considered in conjunction with the specific embodiment described below and in the attached drawing.

DETAILED DESCRIPTION OF THE DRAWING

Figure 1:
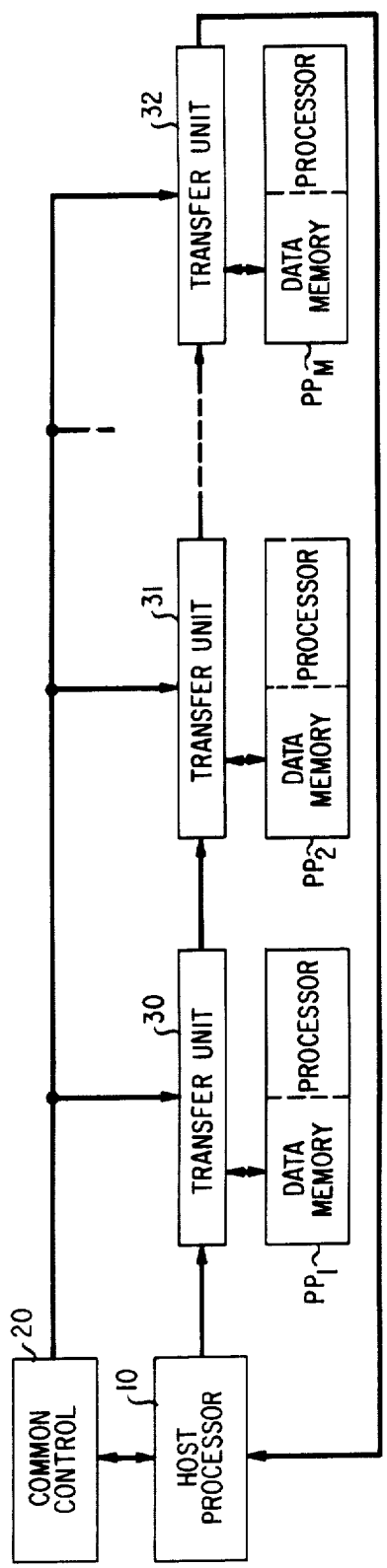
FIG. 1 shows a block diagram of a computer system embodying the present invention.

FIG. 1 shows an overall block diagram of a multiprocessor computer system arranged in one embodiment of the present invention. Host processor 10 is assisted in its data processing function by peripheral processors (PPs), PP 1, PP 2, and PP M. The total number of PPs actually provided in any particular application will depend upon the data processing job steps for which PPs may advantageously be used to speed the overall data processing job of host processor 10. Associated with each PP is PP transfer unit 30, 31 and 32 respectively. Each PP processes the data incoming from the left and the partially processed data is transferred to the next PP in sequence on its right for the next succeeding job step to be performed.

In the simplified block diagram of FIG. 1 the host processor transfers data to a linear sequence of PPs. Data is transferred to each processor in turn and the result is returned to the host processor. As will become clear from the description of FIG. 3 this invention is not limited to a strictly sequential linear data processing path. It is within the scope of the invention that a PP may have inputs from or outputs to any number of the other PPs as necessary to implement the desired data processing function. A linear sequence is shown here to simplify exposition and represents only one of many useful arrangements embraced by the present invention.

PP 1 is typical of the PPs contemplated by the present invention. Each of the other PPs shown in FIG. 1 has a similar internal construction, with details omitted for clarity. PP 1 comprises a processor and a data memory. A processor may be of wired logic design, a single large scale integrated circuit package, or a microcomputer with read-only memory for instruction storage. Data memory is provided typically by random access, read/-write memory. PP 1 operates upon the data stored in data memory, performs whatever data transformation tasks is called for by the particular application and leaves the results in data memory.

After completion by all PPs, processed data is moved simultaneously from data memory of each PP to the data memory of the subsequent PP for the next data processing step. Transfer unit 30 of PP 1, which may embody some or all of the features shown in FIG. 3, controls the orderly transfer of data between the data memory of PP 1 and its neighbors. Transfer unit 31 in PP 2, which may embody features different from transfer unit 30, controls the orderly transfer of data between the data memory of PP 2 and its neighbors.

Figure 2:
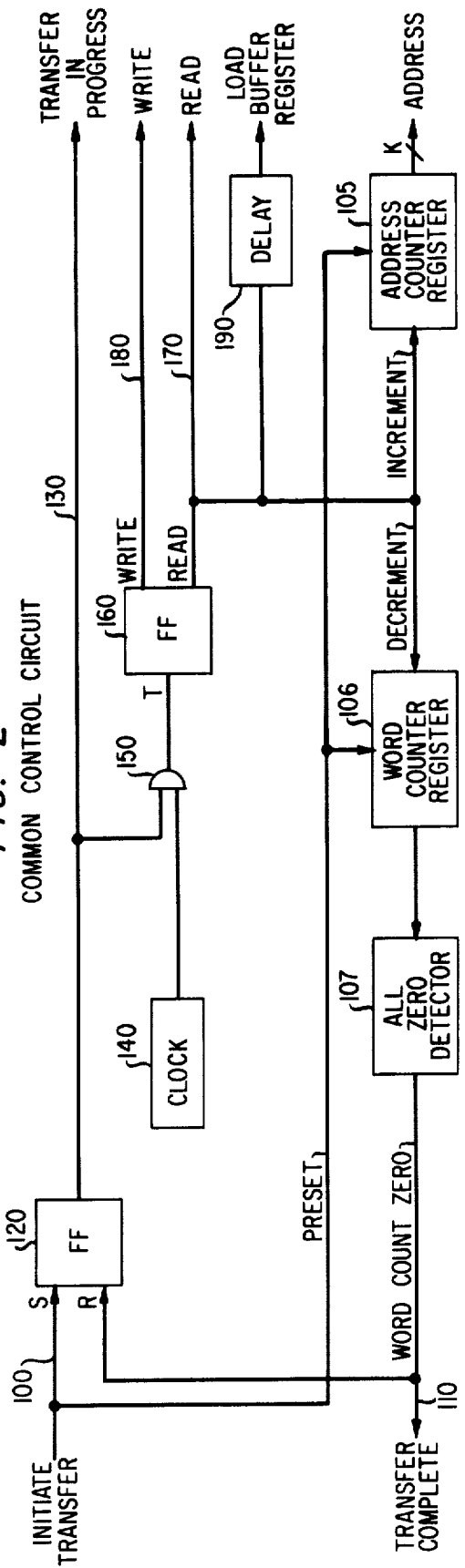
FIG. 2 details a common control circuit for controlling data transfer between peripheral processor transfer units.

Address and control signals are provided to each transfer unit by common control 20 detailed in FIG. 2. After task completion by all PPs, host processor 10 signals common control 20 to begin transfer.

It should be noted that control signals provided by common control 20 could be provided by host processor 10 directly without departing from the scope of the present invention. Common control 20 provides control signals for word-by-word data transfers and operates autonomously once initiated by host processor 10. In this way host processor 10 may occupy itself with other tasks while data transfer is carried out. Alternatively, host processor 10 could provide a word-by-word sequence of control signals to the PPs, thus simplifying the apparatus at the cost of occupying more host processor time.

Similarly, the circuitry of common control 20 could be duplicated for each transfer unit for increased reliability without departing from the scope of the invention.

FIG. 2 shows a common control circuit for applying address and control signals to all of the various PP transfer units in response to requests from the host processor to transfer information from one PP stage to the next. The host processor initiates action by providing a signal on line 100 which sets control flip-flop 120. At the conclusion of activity of the circuit in FIG. 2, a transfer complete signal is produced at lead 110 which is returned to the host and resets flip-flop 120.

Figure 3:
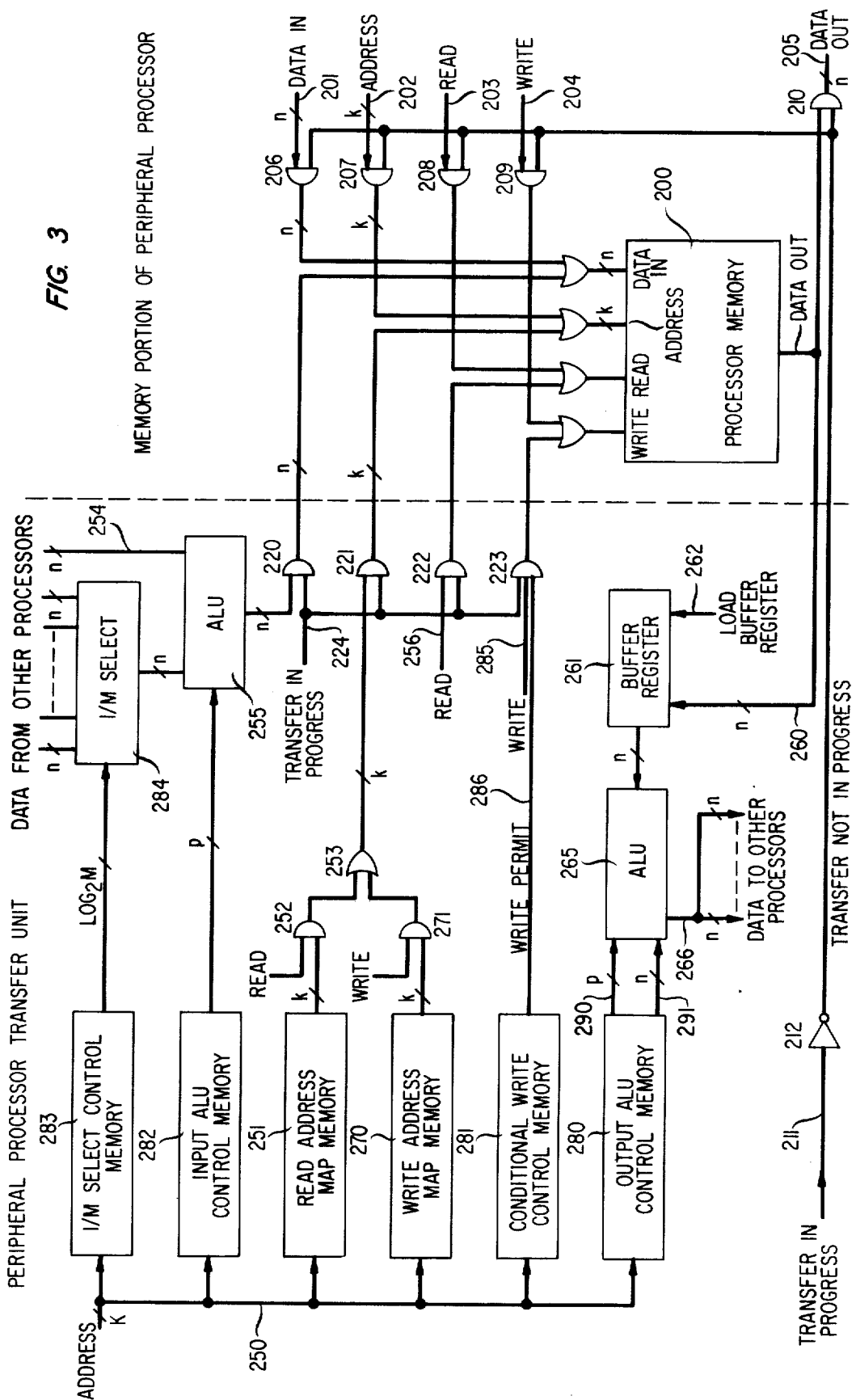
FIG. 3 details an embodiment of a peripheral processor transfer unit and the data memory portion of an associated peripheral processor.

While the common control circuit is active, lead 130 produces a transfer in progress signal which is conveyed to all of the PP transfer units, one of which is shown in FIG. 3. The transfer in progress signal enables AND gate 150 to pass clock signals from clock 140 in order to toggle flip-flop 160 alternately into its set and reset state. This produces alternately occurring read and write signals on output leads 170 and 180 respectively. The read signal is delayed by delay 190 to produce a load buffer register signal.

The read signal is also used to increment address counter register 105 and to decrement word counter register 106. K address signals from address counter register 105 and the read, write, and load buffer register signals are conveyed to each PP transfer unit. Address counter register 105 is preset by the host processor at a convenient original starting address which may be the all zeroes reset state. Word count register 106 is preset with a number of word transfers to be performed in the PP transfer units. As will be discussed further with respect to the conditional write control memory of FIG. 3, the number of words transferred (written) by each transfer unit may be different, and less than the count loaded into word count register 106. Detector 107 determines when word count register 106 has been decremented to the all zero state. Data transfer in the peripheral processor transfer units is then complete, and an output signal is produced on lead 110 to indicate completion to the host processor.

FIG. 3 shows the data memory portion of one PP and its associated transfer unit. In a given application of the present invention there may be a number of PPs each with its own processor memory and transfer unit.

Processor memory 200 is the data memory for the PP. Data is transferred into processor memory 200 for processing through the action of the transfer unit. The result of processing by the PP is left in memory 200 to be transferred out under control of the transfer unit to the next PP in the sequence necessary to provide the overall processing desired.

The PP gains access to memory 200 through the N data lines 205. Through signals appearing on leads 201 through 205 the PP is capable of addressing random locations in processor memory 200 for processing purposes.

Access by the PP to memory 200 is controlled by AND gates 206, 207, 208, 209 and 210. These gates are inhibited by the appearance of a transfer in progress signal on lead 211 which is inverted by invertor 212 during the time when the common control circuit of FIG. 2 is active. This prevents interference by the PP in the action of the transfer unit during the transfer of data.

Access to processor memory 200 is gained by the transfer unit through AND gates 220, 221, 222 and 223. These provide N data leads, K address leads, read and a conditional write control signal respectively which are ORed with the similar signals appearing at AND gates 206 through 209. Gates 220 through 223 are enabled by the transfer in progress signal appearing on lead 224 during the time the transfer unit is under the active control of the common control hardware of FIG. 2.

Operation of a peripheral processor transfer unit will now be described.

The basic purpose of the transfer unit is to write processor memory 200 with data from a previous PP while transferring data from processor memory 200 out to the next. The transfer in progress signal on lead 211 effectively isolates the peripheral processor from processor memory 200 in the manner previously described. A sequence of read, load buffer register, and write signals is applied to the transfer unit from the common control circuit shown in FIG. 2, along with K address signals.

The common control circuit in FIG. 2 places a common address control signal on the K address leads 250. This address is translated in the read address map memory 251 to produce a translated address control signal for processor memory 200 from which address data is actually to be read. The translated address is gated through AND gate 252 by the read signal produced by the common control circuit, proceeds through OR gate 253, and is conveyed to the addressing leads of processor memory 200 through AND gate 221. The read control signal is also gated through AND gate 222 by lead 256 to cause processor memory 200 to output the contents of the addressed data word on output lead 260, which is conveyed to buffer register 261. Data is loaded into buffer register 261 by the load buffer register control signal appearing at lead 262. Delay 190 of FIG. 2 assures synchronism between the appearance of the data and the load buffer register control signal.

The output of buffer register 261 passes unaltered through arithmetic and logic unit 265 to output lead 266 where it is conveyed to the inputs of other PPs. Simultaneously, data from a previous PP transfer unit appears on the N data leads 254. This data is conveyed unchanged through the arithmetic and logic unit 255, through AND gate 220 to the data leads of processor memory 200.

In response to the read, load buffer register, transfer in progress, and address signals extending from the common control circuit to each of the transfer units in the system, each transfer unit has now buffered an output word read from its respective data memory. This buffered data word is now applied to the input leads of the succeeding transfer unit. It is important to note that the buffered data word associated with each PP may have been read from different processor memory locations in each PP. Although each transfer unit received the same addressing signals on its corresponding K address leads 250, the read address map memory 251 will typically map this address into an actual physical address in the corresponding processor memory 200 different from that in other transfer units.

Subsequent to the occurrence of the read and load buffer register control signals, the common control circuit produces a write control signal. Address counter register 105 will not have yet changed, and thus the K address leads 250 carry the same address to write address map memory 270. Memory 270 produces a translated address which is gated through AND gate 271 (which is enabled by the write control signal), OR gate 253 and AND gate 221 to provide a new translated address for processor memory 200. The write control signal for processor memory 200 is provided by AND gate 223 which is enabled by the transfer in progress (lead 224), write (lead 285), and write permit (lead 286) control signals. The write permit control signal will be discussed below. These signals cause processor memory 200 to write the data appearing on the data in leads from the previous transfer unit into the location designated by the translated address.

In this way, during the write portion of the read/write cycle, data appearing in buffer register 261 of each preceding transfer unit is written into processor memory 200 at a location determined by write address map memory 270. As in the case with read address map memory 251, the contents of write address map memory 270 may be different in each succeeding transfer unit. Therefore, although the K address leads 250 convey the same address information to each transfer unit, the read address and write address may be different within a transfer unit and both may be different from all the other transfer units.

The K address leads 250 extend also to conditional write control memory 281 which contains a single bit of information for each addressed location. This bit of information acts as a permission bit to control writing into the translated address. The permission bit is gated onto lead 286 and enables gate 223 to provide a conditional write control signal to processor memory 200 during the write portion of the read/write cycle while a transfer is in progress.

The feature implemented by memory 281 makes it possible for a given transfer unit to write fewer words into its associated processor memory than the total number of read/write cycles emitted by the common control circuit. Thus a long sequence of read/write cycles may be effectively shortened in a transfer unit which needs fewer cycles because of less data to transfer.

The K address leads 250 extend also to output arithmetic logic unit (ALU) control memory 280 which contains two multiple bit fields for each addressed location which are output on the P control leads 290 and the N data leads 291. Output on leads 290 control the function which ALU 265 is to perform upon the data input from buffer register 261. Output on leads 291 serves as a second data input to ALU 265. The ALU performs an arithmetic or logic function combining the two data inputs in the manner specified by the control leads, and produces the result on output leads 266.

The feature implemented by memory 280 and ALU 265 makes it possible to perform additional data processing functions upon data stored in processor memory 200 while it is being transferred out. Processing functions such as shift, rotate, masking, arithmetic and others which might require a second operand are made possible.

The K address leads 250 extend also to 1/M select control memory 283 which contains for each addressed location a multiple bit field of length $\log_2 M$ (M assumed to be a power of 2) where M is the number of inputs, each comprising N leads, to 1/M select 284. The $\log_2 M$ control leads cause 1/M select 284 to convey the input signals on the selected set of input leads to ALU 255.

The feature implemented by memory 283 and 1/M select 284 makes it possible to interleave data input from M different transfer units together for storage in processor memory 200. Thus, as an example, word 1 may be input from PP 5, word 2 from PP 7, etc. as needed to implement the desired data combination for a given processing step.

The K address leads 250 extend also to input arithmetic logic unit (ALU) control memory 282 which contains a single multiple bit field for each addressed location which is output on the P control leads to ALU 255. This output controls the function which ALU 255 is to perform upon data input from N data leads 254 and N data leads from 1/M select 284. ALU 255 performs an arithmetic or logic function combining the two data inputs in the manner specified by the control leads, and produces the result on output leads extending to AND gate 220 for input to processor memory 200.

The feature implemented by memory 282 and ALU 255 makes it possible to perform additional data processing functions upon data being input to the transfer unit prior to its being stored in processor memory 200. Processing functions which require arithmetic or logical combination of data from two different data streams from different PPs are made possible.

In the embodiment described hereinabove, access to processor memory 200 by the PP processor was inhibited during data transfer. This is seen from the described action of invertor 212 and AND gates 206 through 210. This feature was described for ease of exposition only and is not to be taken as a limitation upon the scope of the invention. Other embodiments may implement interleaved data access to processor memory 200 by the PP and the transfer unit. Thus peripheral processing may proceed alternately with data transfer, thus reducing PP idle time and improving hardware utilization at a cost of additional circuit complexity.

Still other embodiments will be evident to those with ordinary skill without departing from the scope of the present invention.

What is claimed is:

1. Apparatus comprising
   a plurality of data memories,
   a source of address control signals,
   means for mapping said address control signals into first translated address control signals,
   means for mapping said address control signals into second translated address control signals, and
   means for transferring data from a location selected in response to said first translated address control signals in a first data memory to a location selected in response to said second translated address control signals in a second data memory.

2. Apparatus comprising
   a plurality of data memories,
   a source of address control signals,
   means for mapping said address control signals into first translated address control signals,
   means for mapping said address control signals into second translated address control signals,
   means for transferring data from a location selected in response to said first translated address control signals in a first data memory to a first data destination, and
   means for transferring data from a location selected in response to said second translated address control signals in a second data memory to a second data destination.

3. Apparatus comprising
   a plurality of data memories,
   a source of address control signals,
   means for mapping said address control signals into first translated address control signals,
   means for mapping said address control signals into second translated address control signals,
   means for transferring data from a first data source to a location selected in response to said first translated address control signals in a first data memory, and
   means for transferring data from a second data source to a location selected in response to said second translated address control signals in a second data memory.

4. Apparatus for transferring data from a first data processor memory to a second data processor memory comprising
   a source of common address control signals,
   means for mapping said common address control signals into first translated address control signals,
   means for mapping said common address control signals into second translated address control signals,
   means for reading data from a location selected in response to said first translated address control signals in said first data processor memory, and
   means for writing said data to a location selected in response to said second translated address control signals in said second data processor memory.

5. Apparatus as set forth in claim 4 further comprising means responsive to said common address control signals for selectively inhibiting writing to said location in said second data processor memory.

6. Apparatus as set forth in claim 4 further comprising
   means responsive to said common address control signals for producing logic control signals, and
   means responsive to said logic control signals for performing selected logical operations upon said data.

7. Apparatus as set forth in claim 6 wherein said selected logical operations include combining said data with selected constant data information.

8. Apparatus as set forth in claim 6 wherein said selected logical operations include combining first said data with second said data.

9. Apparatus as set forth in claim 4 further comprising means responsive to said common address control signals for selecting said first data processor memory from a plurality of such data processor memories.

10. Apparatus for transferring data from a data source to a first data processor memory and for transferring data from said first data processor memory to a second data processor memory comprising
- a source of common address control signals,
- means for mapping said common address control signals into first translated address control signals,
- means for mapping said common address control signals into second translated address control signals,
- first means for reading data from said data source,
- means responsive to said first means for writing data to a location selected in response to said first translated address control signals in said first data processor memory,
- second means for reading data from said first data processor memory, and
- means responsive to said second means for writing data to a location selected in response to said second translated address control signals in said second data processor memory.

11. Apparatus as set forth in claim 10 further comprising
- means responsive to said common address control signals for producing logic control signals, and
- means responsive to said logic control signals for performing selected logical operations upon said data.

12. Apparatus as set forth in claim 11 wherein said selected logical operations include combining said data with selected constant data information.

13. Apparatus as set forth in claim 11 wherein said selected logical operations include combining first said data with second said data.

14. Apparatus as set forth in claim 10 further comprising means responsive to said common address control signals for selectively inhibiting writing to said location in said first data processor memory.

15. Apparatus as set forth in claim 10 further comprising means responsive to said common address control signals for selectively inhibiting writing to said location in said second data processor memory.

16. Apparatus as set forth in claim 10 further comprising means responsive to said common address control signals for selecting said data source from a plurality of such data sources.

17. Apparatus for transferring data from a first data processor memory to a second data processor memory and for transferring data from said second data processor memory to a data destination comprising
- a source of common address control signals,
- means for mapping said common address control signals into first translated address control signals,
- means for mapping said common address control signals into second translated address control signals,
- first means for reading data from a location selected in response to said first translated address control signals in said first data processor memory,
- means responsive to said first means for writing data into said second data processor memory,
- second means for reading data from a location selected in response to said second translated address control signals in said second data processor memory, and
- means responsive to said second means for writing data into said data destination.

18. Apparatus as set forth in claim 17 further comprising
- means responsive to said common address control signals for producing logic control signals, and
- means responsive to said logic control signals for performing selected logical operations upon said data.

19. Apparatus as set forth in claim 18 wherein said selected logical operations include combining said data with selected constant data information.

20. Apparatus as set forth in claim 18 wherein said selected logical operations include combining first said data with second said data.

21. Apparatus as set forth in claim 17 further comprising means responsive to said common address control signals for selecting said first data processor memory from a plurality of such data processor memories.

* * * * *